US010747882B2

(12) United States Patent
Liu et al.

(10) Patent No.: US 10,747,882 B2
(45) Date of Patent: Aug. 18, 2020

(54) SYSTEM AND METHOD FOR SECURE BOOT OF AN INFORMATION HANDLING SYSTEM USING VERIFICATION SIGNATURE AND INCLUDING VERIFYING APPLICATIONS

(71) Applicant: DELL PRODUCTS, LP, Round Rock, TX (US)

(72) Inventors: Wei Liu, Austin, TX (US); Prakash Nara, Round Rock, TX (US); Sudhir V. Shetty, Cedar Park, TX (US); Marshal F. Savage, Austin, TX (US); Charles E. Rose, Nashua, NH (US); Mukund P. Khatri, Austin, TX (US); Madhav Karri, Austin, TX (US); Santosh Kumar, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 519 days.

(21) Appl. No.: 15/467,545

(22) Filed: Mar. 23, 2017

(65) Prior Publication Data
US 2018/0276387 A1    Sep. 27, 2018

(51) Int. Cl.
*G06F 21/57*   (2013.01)
(52) U.S. Cl.
CPC .................................. *G06F 21/575* (2013.01)
(58) Field of Classification Search
None
See application file for complete search history.

(56) References Cited

U.S. PATENT DOCUMENTS

| 8,504,839 | B2 | 8/2013 | Krig | |
|---|---|---|---|---|
| 8,914,627 | B2 | 12/2014 | Park et al. | |
| 2002/0194533 | A1* | 12/2002 | Largman | G06F 11/1451 714/13 |
| 2003/0014619 | A1* | 1/2003 | Cheston | G06F 11/1417 713/1 |
| 2004/0111559 | A1* | 6/2004 | Heil | G06F 9/4405 711/114 |
| 2009/0119221 | A1* | 5/2009 | Weston | G07F 7/1016 705/76 |
| 2012/0210115 | A1* | 8/2012 | Park | H04L 9/3247 713/2 |
| 2014/0365755 | A1* | 12/2014 | Liu | G06F 21/572 713/2 |
| 2016/0019106 | A1* | 1/2016 | Ali | G06F 9/4408 714/6.23 |
| 2016/0119137 | A1* | 4/2016 | Sethumadhavan | H04L 9/0825 713/190 |
| 2017/0177873 | A1* | 6/2017 | Raghuram | G06F 21/575 |

* cited by examiner

*Primary Examiner* — William J. Goodchild
(74) *Attorney, Agent, or Firm* — Larson Newman, LLP

(57) ABSTRACT

A verification for a secure boot process may include determining a determined signature for a compendium stored in a memory where the compendium includes a bootloader and an operating system, accessing a verification signature corresponding to the compendium, and comparing the verification signature with the determined signature where if the verification signature is the same as the determined signature, the compendium is verified as secure and a secure boot process is performed with the bootloader and operating system. The compendium may include one or more applications such that the applications may be verified as secure with the verification signature.

20 Claims, 7 Drawing Sheets

SYSTEM AND METHOD FOR SECURE BOOT OF AN INFORMATION HANDLING SYSTEM USING VERIFICATION SIGNATURE AND INCLUDING VERIFYING APPLICATIONS

FIELD OF THE DISCLOSURE

This disclosure generally relates to information handling systems, and more particularly relates to securely booting information handling systems using signatures, including verifying applications as part of the secure boot process.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A verification for a secure boot process may include determining a determined signature for a compendium stored in a memory where the compendium includes a bootloader and an operating system, accessing a verification signature corresponding to the compendium, and comparing the verification signature with the determined signature. If the verification signature is the same as the determined signature, then the compendium is verified as secure and a secure boot process is performed with the bootloader and operating system. The compendium may include one or more applications that may run in a computing environment provided by the operating system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
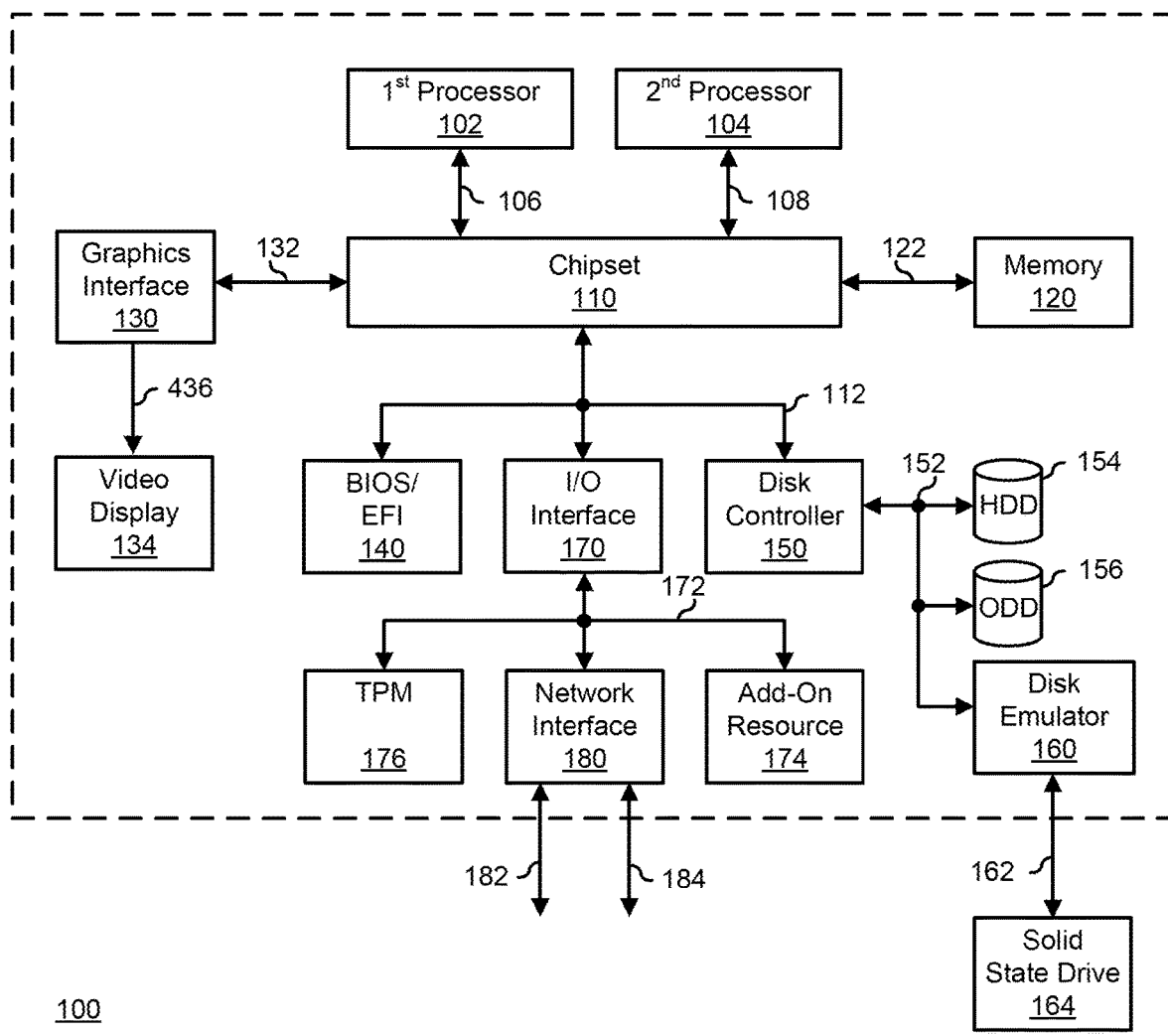
FIG. 1 is a block diagram illustrating a generalized information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174, to a TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

An information handling system, such as a server or diverse other computers, may run one or more applications with an operating system running on the information handling system, and a basic input/output system (BIOS) on the information handling system may support the operating system. The BIOS may operate above the hardware layer of the information handling system, providing a firmware layer interface between the operating system and the hardware comprising the information handling system. The BIOS may be considered part of the firmware of the information handling system and the firmware may include instructions executable to initialize and test the hardware components, and to load a bootloader or the operating system.

A BIOS provides an abstraction layer for the hardware, for example, a consistent way for application programs and operating systems to interact with the hardware devices. When power is first applied to an information handling system, the system begins a sequence of initialization procedures. During the initialization sequence, also referred to as a boot sequence, components of the system are configured and enabled for operation.

A powered-down information handing system may be booted or a powered-on information handling system may be rebooted in a boot process, and as, part of the boot process, the BIOS or portion of the BIOS of the information handling system, such as a BIOS boot manager, may load a bootloader which in turn loads the operating system which supports application level programs which run in the computing environment on the information handling system provided by the operating system.

Figures 2, 3:
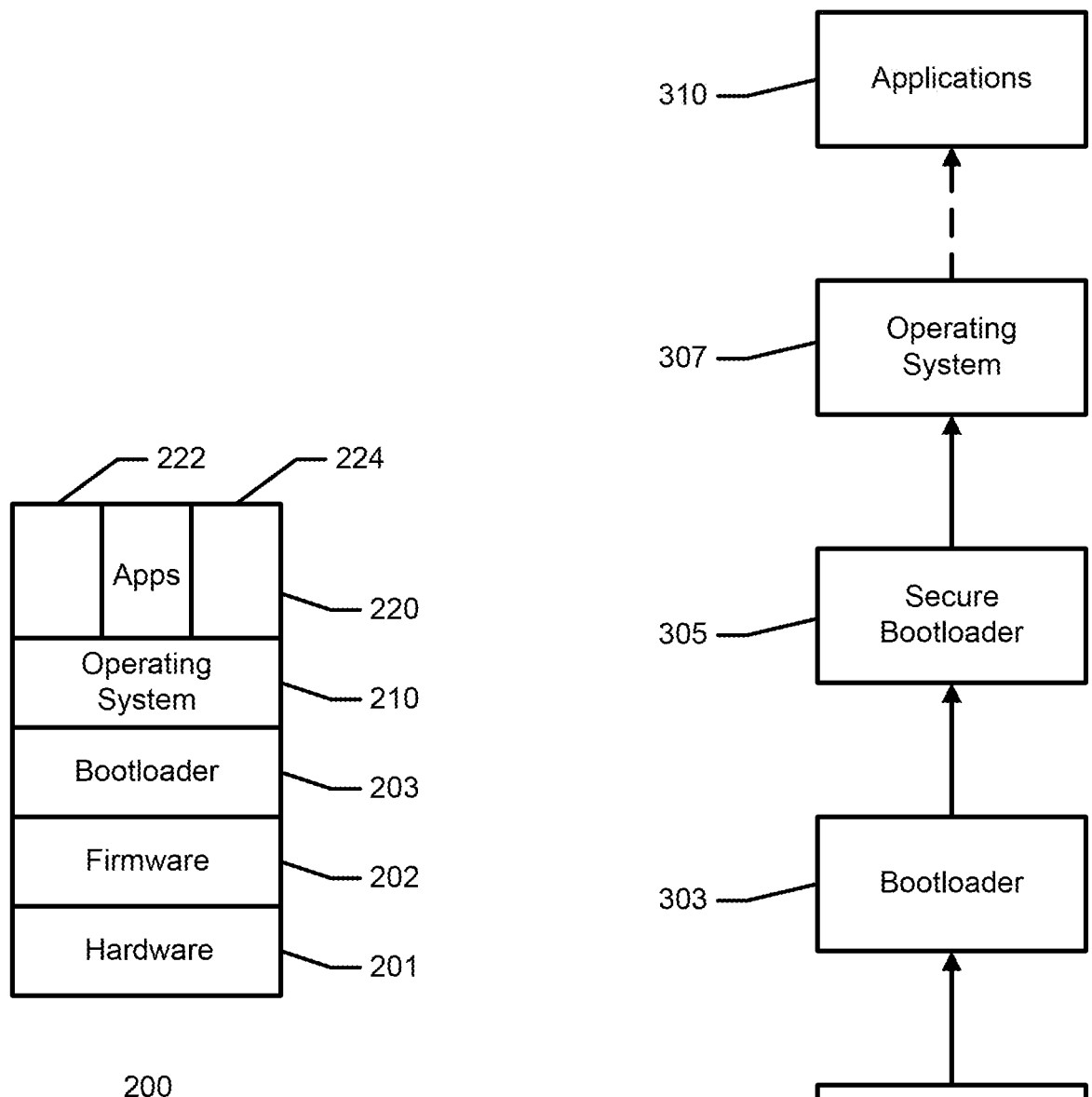
FIG. 2 illustrates an example information handling system stack for a boot process.
FIG. 3 illustrates an example boot process for booting an information handling system.

FIG. 2 shows an information handling system stack 200 for a boot process. Information handling system stack 200 includes hardware 201, firmware 202, bootloader 203, operating system 210, and applications 220. Hardware 201 may be thought of as the hardware layer and comprises the hardware of the information handling system, for example, the processors and memories of the information handling system. Firmware layer 202 includes the BIOS or portion thereof and sits above hardware layer 201 and provides firmware control of hardware in hardware layer 201.

Bootloader 203 sits above firmware layer 202 and may load the operating system of operating system layer 210 during a boot process. Bootloader 203 is transient, existing during the boot process or portion of the boot process, and loads operating system 210 as part of the boot process. Operating system 210 supports an application layer 220 which may include applications 222 and 224. When loaded during a boot process of the information handling system, operating system 210 may provide a computing environment for applications 222 and 224. An example of an operating system may be the Linux operating system providing a Linux kernel supporting applications such as word processing applications, for example. In steady-state operation of the information handling system, bootloader 203 disappears, and is stored as a file in memory. Bootloader 203 may be a part of operating system 210.

In embodiments, the bootloader may be a single bootloader or be considered a composite bootloader made of a first-stage or generalized bootloader and a secure or proprietary bootloader provided by an Original Equipment Manufacturer for security.

FIG. 3 illustrates a boot process 300 for booting an information handling system involving a generalized bootloader and a secure bootloader. A BIOS boot manager 301 begins a secure boot process of the information handling system. BIOS boot manager 301 loads generalized bootloader 303 and authenticates the generalized bootloader 303 by, for example, verifying a signature of the generalized bootloader. If generalized bootloader 303 is verified, generalized bootloader 303 then verifies secure bootloader 305. To securely load the operating system 307, secure bootloader 305 passes a detected signature of operating system 307 to generalized bootloader 303 for verification.

If a signature of generalized bootloader 303, secure bootloader 305, or operating system 307 cannot be verified, the boot process may be terminated as unsecure, or an unsecure boot may be performed. In the verification chain shown in boot process 300, verification terminates at operating system 307, and thus applications 310 are not verified. If applications 310 are not verified, the applications may be unsecure and compromised, posing security risks to the entire system.

To verify the compendium of generalized bootloader, secure bootloader, operating system, and applications, and thus extend verification to applications, a signature or signatures of the compendium of generalized bootloader, secure bootloader, operating system, and applications may be made and stored in memory as stored verification signature(s); upon boot, the BIOS will read the compendium of generalized bootloader, secure bootloader, operating system, and applications to be loaded as stored in memory, cryptographically determine the signature(s) of the compendium to be loaded, and compare the determined signature(s) of the compendium to be loaded with the stored verification signatures of the compendium. If the determined signature(s) differs from the verification signature(s), then there has been a corruption in at least one of generalized bootloader, secure bootloader, operating system and applications, and this may indicate a security breach.

The above secure verification mechanism may be leveraged for swift verification using multiple signatures, corruption location detection using multiple signatures and alternative secure boot. For example, in a system on chip (SOC) or multiple processor core central processing unit (CPU) with multiple processor cores, the compendium of generalized bootloader, secure bootloader, operating system, and applications may be broken into a number of chunks or segments corresponding to the number of processor cores and a chunk or segment allocated to a processor core for processing so that the compendium is processed by the multiple processor cores for verification, allowing for swift verification. In such an embodiment, the number of signatures could correspond to the number of processor cores. Of course, the ability to allocate chunks or segments to multiple processor cores for swifter verification does not preclude a subset of the multiple processor cores being used for verification.

With regard to corruption location detection, when the compendium of generalized bootloader, secure bootloader, operating system, and applications is broken into a number of chunks or segments with corresponding signatures, the various chunks or segments may be verified, and if a particular chunk or segment fails verification, then a corruption has occurred within that segment, allowing for corruption location detection. With regard to alternative secure boot, an alternative compendium of firmware, bootloader, operating system and applications may be stored in a memory and used for secure booting if the primary compendium of firmware, bootloader, operating system and applications is determined to be corrupt.

Figure 4:
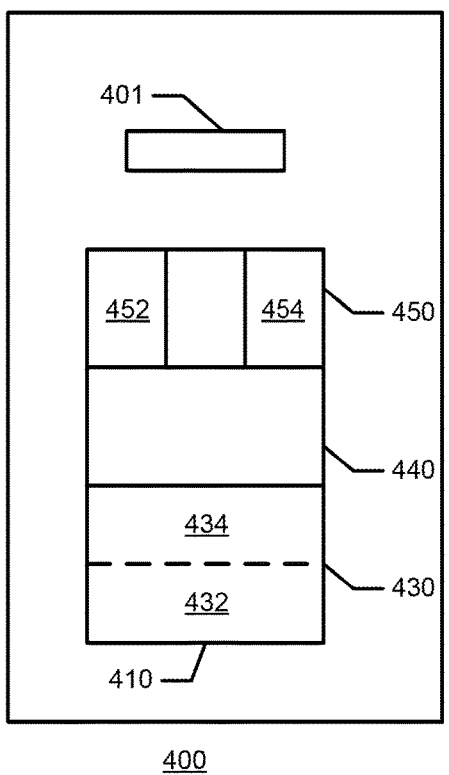
FIG. 4 illustrates an information handling system memory and contents according to an embodiment of the present disclosure.

FIG. 4 shows a memory 400 in accordance with embodiments described above. Stored on memory 400 is signature 401 and compendium 410. Compendium 410 includes bootloader 430, operating system 440 and applications 450. Bootloader 430 may be a composite bootloader including a first-stage or generalized bootloader 432 and a secure or proprietary bootloader 434. Applications 450 may include individual applications 452 and 454.

Signature 401 may be stored in memory 400 appended to compendium 410. For example, compendium 410 may be stored in memory as a file or in a file, and signature 401 may be appended to the file in memory. Compendium 410 may be stored in memory in a succession of continuous memory addresses. Signature 401 may be a verification signature for compendium 410, and may be determined, for example calculated, by a public/private key signing of compendium 410 to produce verification signature 401.

A verification signature may be generated or created at or contemporaneous with the time of creation and storage of the corresponding compendium. For example, the compendium may be created, the verification signature generated from the compendium, and then the compendium and corresponding verification signature stored in memory.

As part of a boot process, to verify the bootloader, operating system and applications to be loaded as part of the boot process, at initial stage of the boot process, a BIOS boot manager in firmware determines a determined signature of compendium 410, for example, by a public/private key signing of compendium 410 to produce a determined signature. To verify compendium 410, this determined signature of compendium 410 is compared with verification signature 401; if the determined signature is the same as verification signature 401, then compendium 410 is verified as secure and secure boot with the constituent bootloader, operating system and applications of compendium 410 may proceed in a secure boot process. If however, the determined signature differs from verification signature 401, then compendium 410 is corrupted, and an unsecure boot may be executed, alternative boot process may be performed or boot processes may be terminated.

The BIOS may contain the public key, when verifying a compendium, the BIOS may decrypt the verification signature using the public key; then the BIOS may hash the compendium, for example using the public key, and compare the generated hash values from the verification signature and the compendium.

Figure 5:
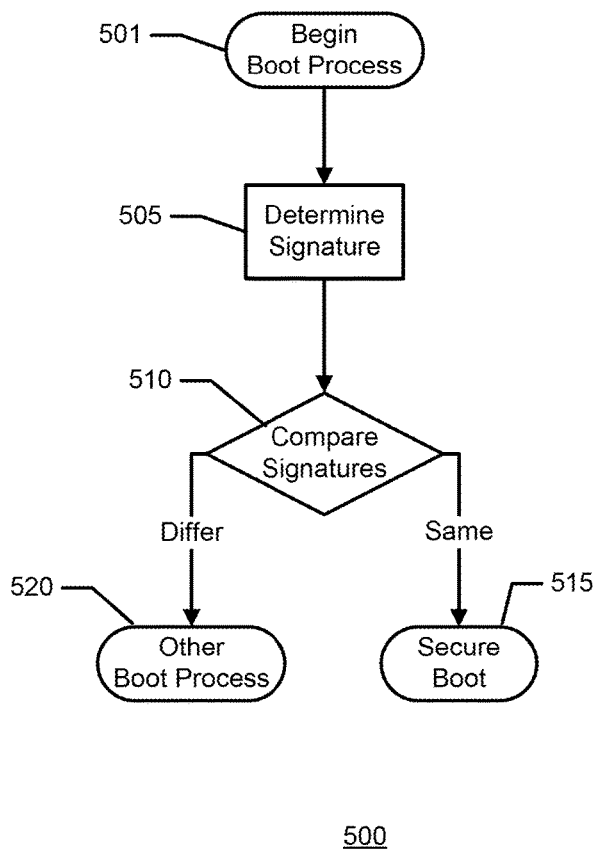
FIG. 5 illustrates a secure booting method according to an embodiment of the present disclosure.

FIG. 5 shows a secure verification process 500 in accordance with embodiments described herein. At 501, the boot process begins and a BIOS boot manager begins the boot process. At 505, the BIOS boot manager determines a determined signature for compendium 410. At 510, the BIOS boot manager compares verification signature 401 with the determined boot signature. If the determined signature and verification signature 401 are the same, then compendium 410 is verified as secure, the verification process ends at 515, and a secure boot process is executed with compendium 410. If the determined signature and verification signature 401 differ, then compendium 410 is corrupt and, at 520, the verification process ends. If compendium 410 is determined to be corrupt, an unsecure boot may performed, the boot process may be terminated, or an alternative boot process may be performed. The alternative boot process may be based on a portion of compendium 410, or may be based on software exclusive of that contained in compendium 410.

Multiple signatures may be leveraged to expedite verification as disclosed herein. More particularly, in a processor with multiple processor cores, or an information handling system with multiple processors, a compendium of generalized bootloader, secure bootloader, operating system, and applications may be logically segmented, and respective signatures calculated for each of the logical segments of the compendium. Verification of the signatures may be divided among multiple cores or processors to expedite verification of the compendium.

Figure 6:
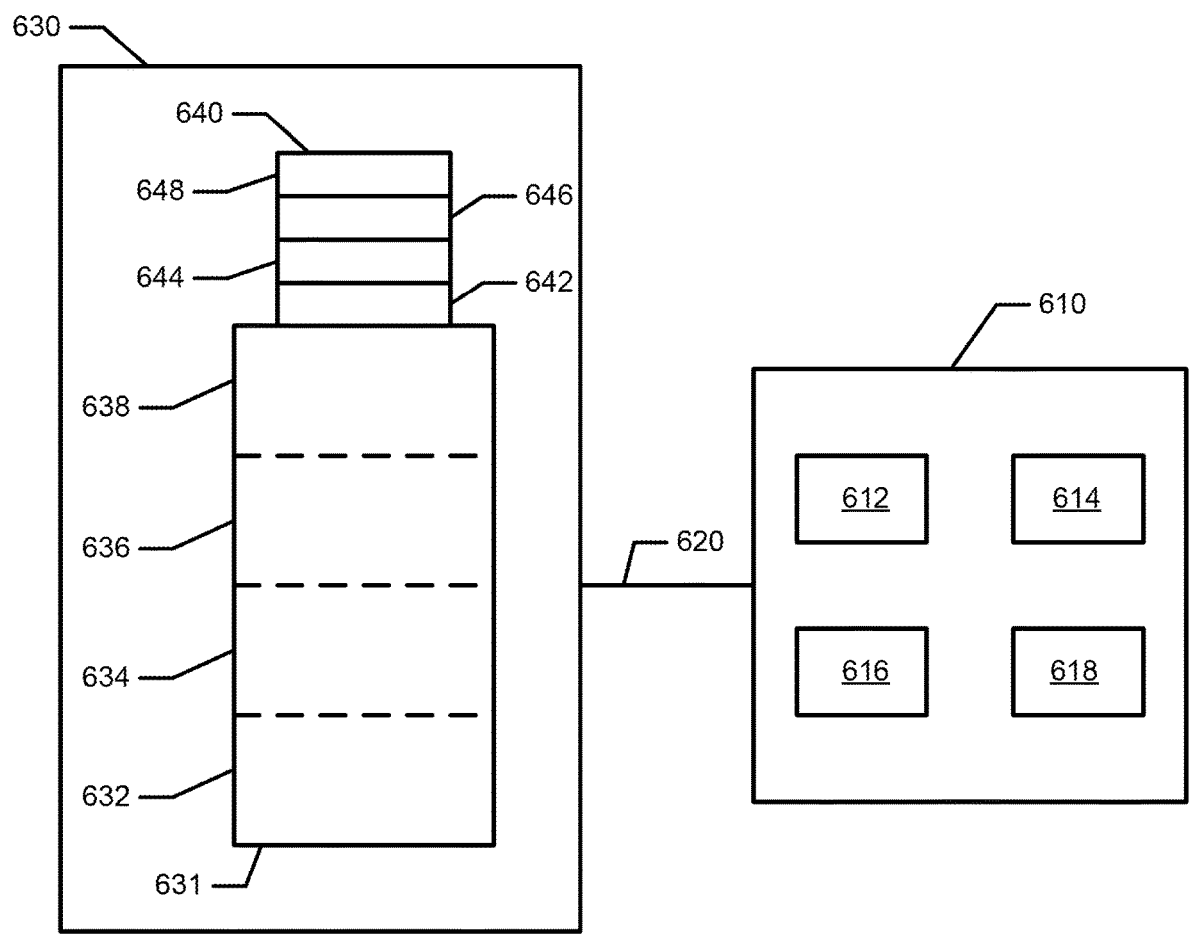
FIG. 6 illustrates an information handling system according to an embodiment of the present disclosure.

FIG. 6 shows a system verification system 600. System verification system 600 includes processor 610 and memory 630, and processor 610 is coupled to access memory 630 by bus 620, as shown. Processor 610 includes four processor cores: processor core 612, processor core 614, processor core 616, and processor core 618. Memory 630 stores a compendium 631 including a bootloader, an operating system and applications, as well as verification signatures 640. As shown in FIG. 6, compendium 631 is logically segmented into four segments: segment 632, segment 634, segment 636, and segment 638. Verification signatures 640 include: verification signature 642, verification signature 644, verification signature 646, and verification signature 648. Verification signatures 640 may be appended to compendium 631 and in embodiments, may be considered part of compendium 631.

Verification signature 642 corresponds to segment 632, verification signature 644 corresponds to segment 634, verification signature 646 corresponds to segment 636, and verification signature 648 corresponds to segment 638. That is, verification signature 642 is for verification of segment 632, verification signature 644 is for verification of segment 634, verification signature 646 is for verification of segment 636, and verification signature 648 is for verification of segment 638.

In a verification process, processor 610 may access compendium 631 over bus 620; verification of segment 632 may be allocated to processor core 612 (using corresponding verification signature 642), verification of segment 634 may be allocated to processor core 614 (using corresponding verification signature 644), verification of segment 636 may be allocated to processor core 616 (using corresponding verification signature 646), and verification of segment 638 may be allocated to processor core 618 (using corresponding verification signature 648). Thus by logically segmenting compendium 631 into four logical segments (632, 634, 636, 638) for verification using corresponding verification signatures (642, 644, 646, 648) and allocating the different logical segments to four different processor cores (respectively 612, 614, 616, 618) for verification, verification of compendium 631 may be expedited, for example, fourfold.

Figure 7:
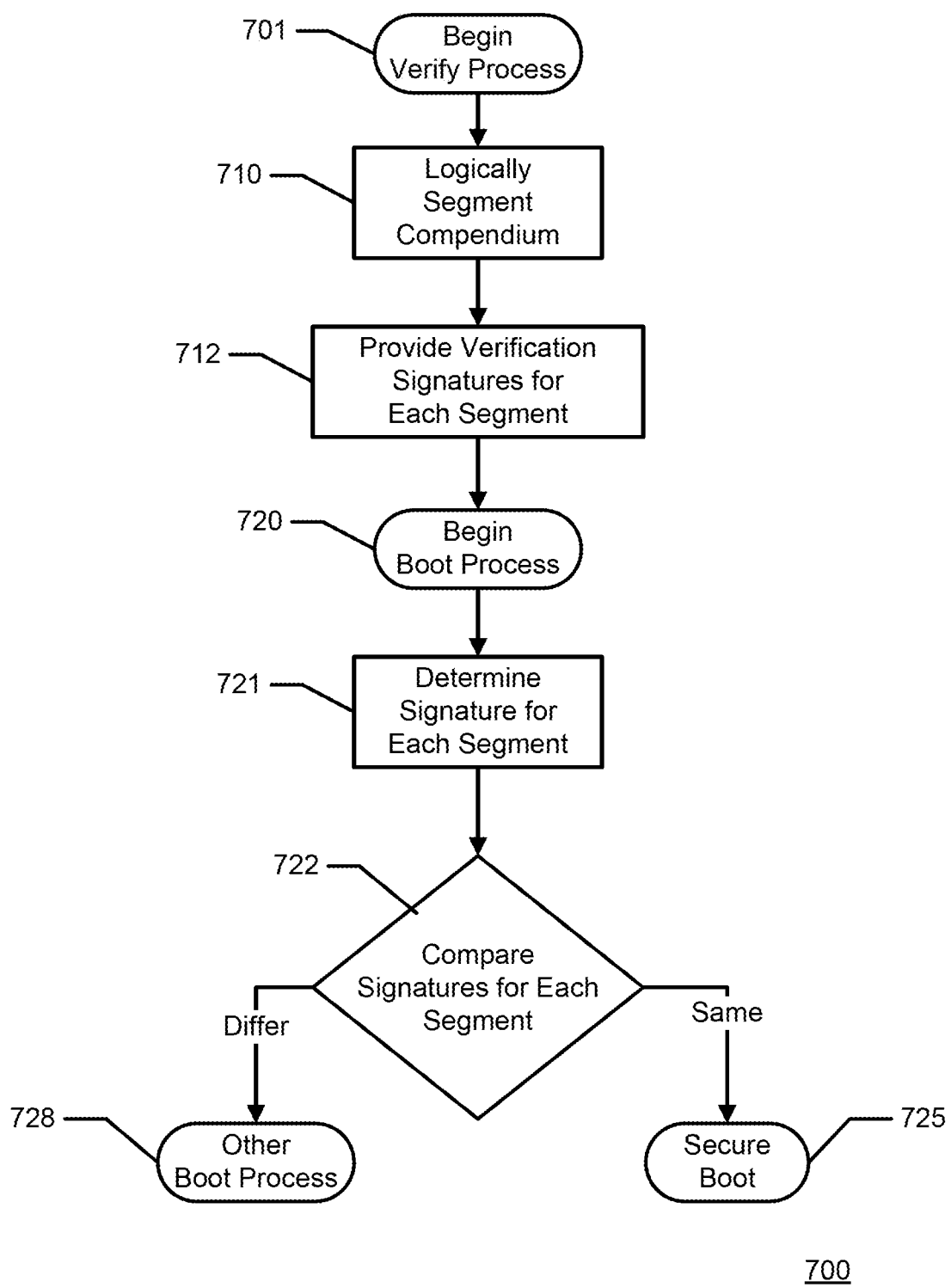
FIG. 7 illustrates a secure booting method according to an embodiment of the present disclosure.

FIG. 7 shows a secure verification process 700 in accordance with embodiments described herein, for example, system 600 of FIG. 6. At 701, the generalized verification process begins. At 710, compendium 631 is logically segmented into logical segments 632, 634, 636 and 638. At 712, verification signatures 640 are provided to provide a corresponding verification signature for each logical segment. Verification signatures 640 include verification signature 642 corresponding to segment 632, verification signature 644 corresponding to segment 634, verification signature 646 corresponding to segment 636, and verification signature 648 corresponding to segment 638.

At 720, the boot process begins and a BIOS boot manager begins the boot process. At 721, the BIOS boot manager determines a determined signature for each of logical segments 632, 634, 636 and 638 of compendium 631. At 722, the BIOS boot manager compares the determined signature for each logical segment with the verification signature corresponding to the logical segment. For example, the determined signature determined from logical segment 638 is compared with corresponding verification signature 648.

If the determined signatures determined from the logical segments and corresponding verification signatures 640 are the same, then compendium 631 is verified as secure, the verification process ends at 725, and a secure boot process is executed with compendium 631. If a determined signature of a logical segment and a corresponding verification signature differ, then compendium 631 is corrupt. If compendium 631 is determined to be corrupt, at 728, an unsecure boot may performed, the boot process may be terminated, or an alternative boot process may be performed. The alternative boot process may be based on a portion of compendium 631, or may based on software exclusive of that contained in compendium 631.

Furthermore, performing verification using two or more logical segments and two or more corresponding signatures may allow for locating corruption location in a compendium. For example, in FIG. 6, if verification signature 648 fails to match the determined signature determined from corresponding logical segment 638, then there has been a corruption in logical segment 638, and a corruption has been detected with regard to a particular logical segment. In embodiments, a logical segment may include the bootloader, a logical segment may include the operating system, and one or more logical segments may include the applications. Thus, it may be possible to detect a corruption in regard to the bootloader, operating system or applications depending on the segment(s) in which corruption is detected; if the corruption is isolated in one of the applications, then a partial secure boot may be performed.

If it is determined that a compendium has been corrupted, in embodiments, an alternative secure boot may be performed, using, for example, a secondary or backup compendium.

Figure 8:
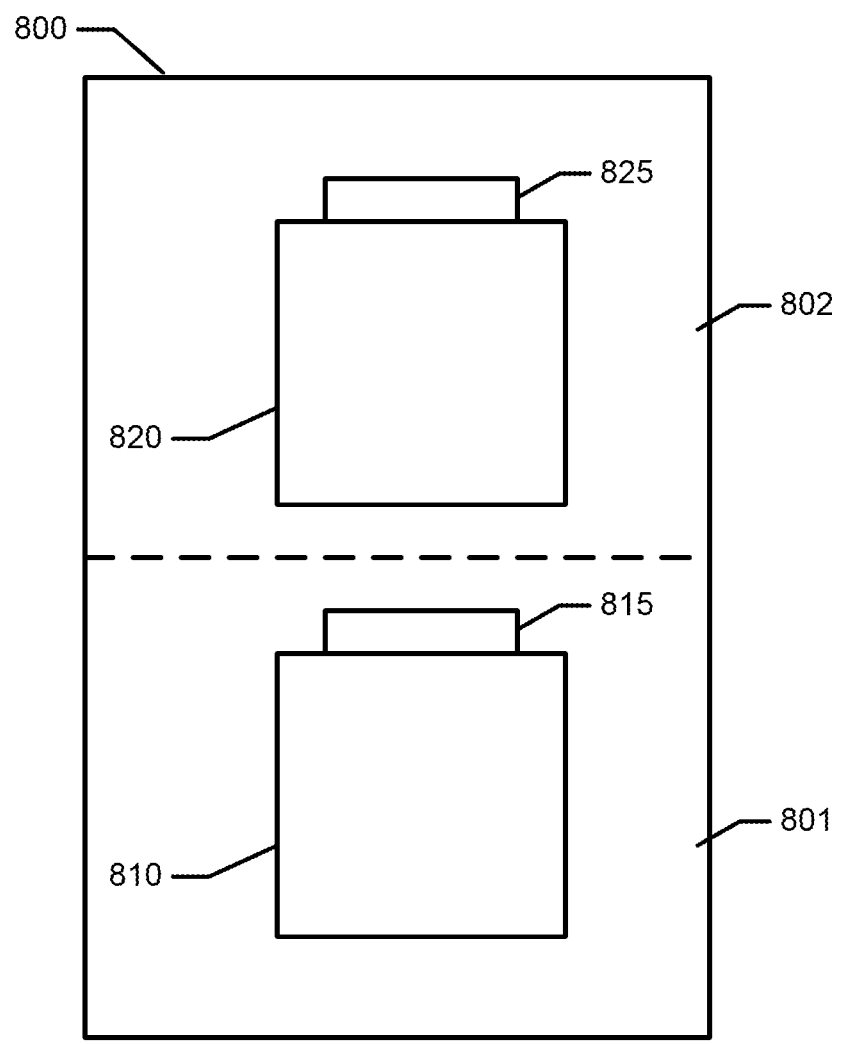
FIG. 8 illustrates an information handling system memory and contents according to an embodiment of the present disclosure.

FIG. 8 shows a memory 800 configured to provide for an alternative secure boot. Memory 800 is logically divided into portion 801 and portion 802. Stored in portion 801 of memory 800 is compendium 810. Compendium 810 includes a bootloader, an operating system and applications. Appended to compendium 810 is corresponding verification signature 815 for verification of compendium 810. Stored in portion 802 of memory 800 is compendium 820. Compendium 820 includes a bootloader, an operating system and applications. Appended to compendium 820 is corresponding verification signature 825 for verification of compendium 820. Compendium 820 may be used to perform an alternative secure boot in the event compendium 810 is determined to be corrupted and so cannot be used for a secure boot.

More particularly, as part of a boot process, a BIOS boot manager determines a determined signature for compendium 810 and compares the determined signature with verification signature 815; if the signatures corresponding to compendium 810 match, then a secure boot is performed using compendium 810; if the signatures corresponding to compendium 810 fail to match, then the BIOS boot manager performs an alternative secure boot using compendium 820. To this end, the BIOS boot manager determines a determined signature for compendium 820 and compares the determined signature with verification signature 825; if the signatures corresponding to compendium 820 match, then an alternate secure boot is performed using compendium 820.

Figure 9:
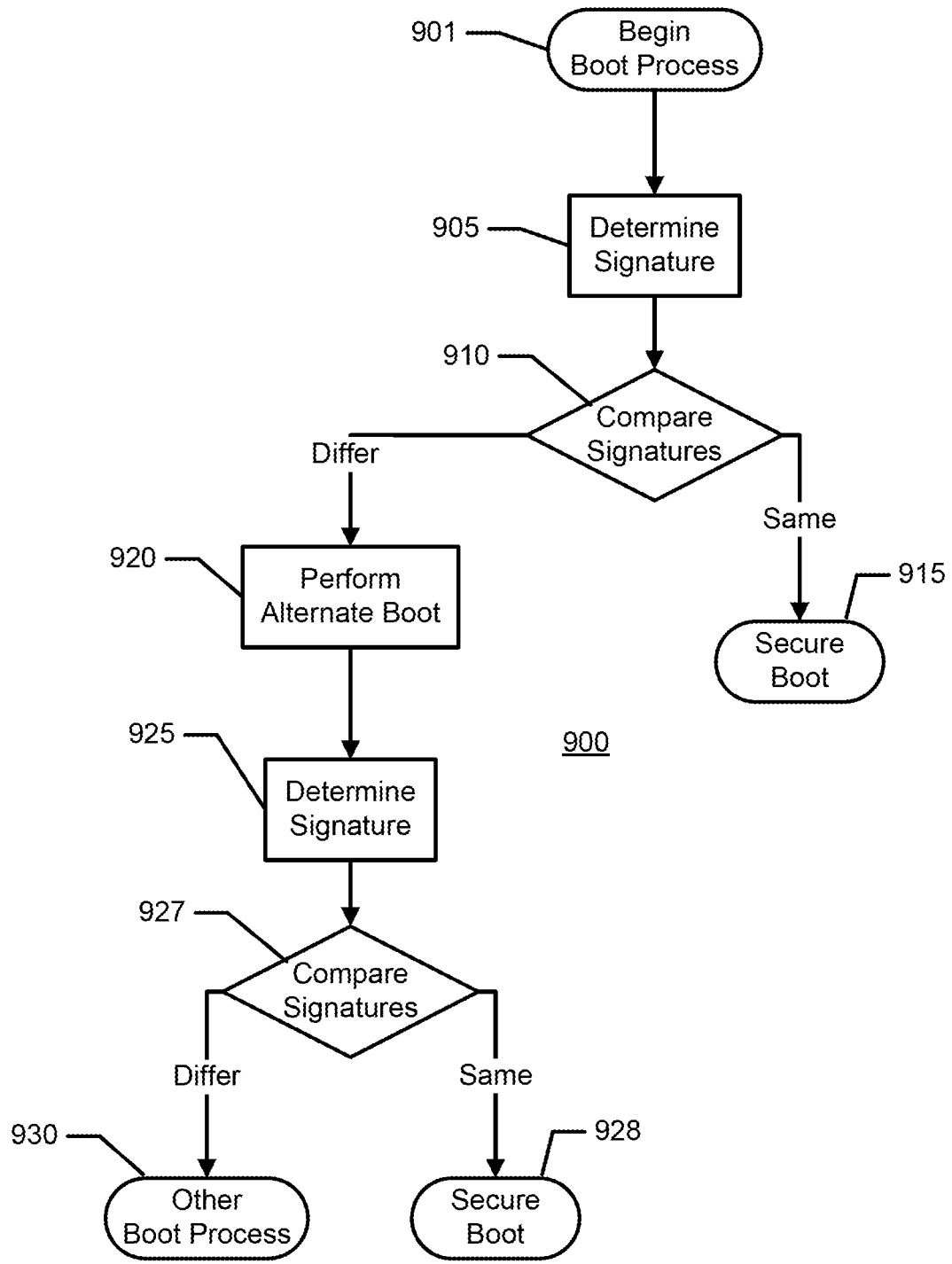
FIG. 9 illustrates a secure booting method according to an embodiment of the present disclosure.

FIG. 9 shows a secure verification process 900 in accordance with embodiments described herein, for example, memory 800 of FIG. 8. At 901, the boot process begins and a BIOS boot manager begins the boot process. At 905, the BIOS boot manager determines a determined signature for compendium 810. At 910, the BIOS boot manager compares the determined boot signature of compendium 810 with corresponding verification signature 815.

If the determined signature for compendium 810 and corresponding verification signature 815 are the same, then compendium 810 is verified as secure, the verification process ends at 915, and a secure boot process is executed with compendium 810. If the determined signature and verification signature 815 of compendium 810 differ, then compendium 810 is corrupt, and an alternative secure boot process is performed at 920. At 925, the BIOS boot manager determines a determined signature for compendium 820. At 927, the BIOS boot manager compares the determined boot signature of compendium 820 with corresponding verification signature 825.

If the determined signature and verification signature 825 are the same, then compendium 820 is verified as secure, the verification process ends at 928, and the alternate secure boot process is executed with compendium 820. If the determined signature and verification signature 825 of compendium 820 differ, then compendium 820 is corrupt, and an alternative boot process is performed at 930. As would be understood by one of skill in the art, multiple processors or processor cores and multiple signatures and logical segmenting of compendiums 810 and 820 may be used to expedite the secure boot process as described with regard to FIG. 9.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method for system verification for a secure boot process, the method comprising:
   determining a determined signature for a compendium stored in a memory, the compendium segmented into a number of logical segments corresponding to a number of processor cores, the compendium including a bootloader and an operating system;
   accessing a verification signature corresponding to the logical segments of the compendium, the verification signature stored in the memory; and
   comparing the verification signature with the determined signature, wherein if the verification signature is the same as the determined signature, then the compendium is verified as secure and a secure boot process is performed with the bootloader and operating system,
   wherein each one of the logical segments is appended with the corresponding verification signature and allocated to a corresponding processor core of the processor cores for verification.

2. The method of claim 1, wherein the compendium includes one or more applications supported by the operating system.

3. The method of claim 1, wherein if the verification signature differs from the determined signature, the compendium determined to be corrupted.

4. The method of claim 3, wherein if the compendium determined to be corrupted, an alternative boot process is performed.

5. The method of claim 4, wherein the alternative boot process includes:
   accessing a backup compendium stored in the memory;
   determining a determined backup signature for the backup compendium;
   accessing a backup verification signature corresponding to the backup compendium;
   comparing the backup verification signature with the determined backup signature.

6. The method of claim 5, wherein if the backup verification signature is the same as the determined backup signature, the backup compendium is verified as secure and an alternate secure boot process is performed with the backup compendium.

7. The method of claim 1, wherein the logically segmented compendium includes a first logical segment and a second logical segment, the first logical segment distinct from the second logical segment, and wherein the memory includes a first verification signature corresponding to the first logical segment and a second verification signature corresponding to the second logical segment.

8. The method of claim 7, further comprising:
   determining a first determined signature for the first logical segment with a first processor core; and
   determining a second determined signature for the second logical segment with a second processor core, the first processor core distinct from the second processor core.

9. The method of claim 8, further comprising:
   comparing the first verification signature with the first determined signature; and
   comparing the second verification signature with the second determined signature.

10. An information handling system, comprising:
a memory storing a compendium that is logically segmented into a number of segments corresponding to a number of processor cores, the segments including a first logical segment and a second logical segment with an appended a first verification signature and a second verification signature, respectively, wherein the compendium includes a bootloader and an operating system; and
a processor including a first processor core and a second processor core that are configured to access the memory; and
a BIOS boot manager running on the processor causing the first processor core to perform operations including:
determining a first determined signature for the first logical segment;
accessing the first verification signature; and
comparing the first verification signature with the first determined signature,
wherein if the first verification signature is the same as the first determined signature, then the first logical segment of the compendium is verified as secure and a partially secure boot process is performed with the bootloader and operating system.

11. The information handling system of claim 10, wherein the compendium includes one or more applications.

12. The information handling system of claim 11, wherein if the first verification signature differs from the first determined signature, the first logical segment of the compendium is determined to be corrupted.

13. The information handling system of claim 12, wherein a partial secure boot process is performed when the second logical segment is determined to be secure.

14. The information handling system of claim 13, wherein the second processor core determines a second determined signature for the second logical segment and compares the second determined signature with a second verification signature to verify the second logical segment of the compendium.

15. The information handling system of claim 12, wherein the compendium is stored in the memory in a succession of continuous memory addresses.

16. The information handling system of claim 12, wherein the memory stores a backup compendium mirroring the compendium and a corresponding backup verification signature.

17. The information handling system of claim 16, wherein when the compendium is determined to be corrupted, a determined backup signature is determined from the backup compendium and compared to the backup verification signature.

18. A memory storing firmware that when executed by a processor instantiates a BIOS boot manager that performs operations comprising:
determining first and second determined signatures for a compendium stored in a second memory, the compendium broken into a number of logical segments corresponding to a number of processor cores, the logical segments including first and a second logical segments for a bootloader and an operating system, respectively, of the compendium;
accessing first and a second verification signatures corresponding to the first and second logical segments; and
comparing the first and second verification signatures with the determined first and second determined signatures, respectively, wherein if the first and second verification signatures are the same as the determined first and second determined signatures, then the corresponding processor core verifies the compendium as secure and a secure boot process is performed with the bootloader and operating system.

19. The memory storing firmware of claim 18, wherein if the verification signature differs from the determined signature, the BIOS boot manager performs an alternative boot process using a backup compendium stored on the second memory.

20. The memory storing firmware of claim 18, wherein the first determined signature is determined for the first logical segment using a first processor and the second determined signature is determined for the second logical segment using a second processor.

* * * * *